(12) United States Patent
Larson

(10) Patent No.: US 6,754,690 B2
(45) Date of Patent: *Jun. 22, 2004

(54) METHOD FOR TIME PARTITIONED APPLICATION SCHEDULING IN A COMPUTER OPERATING SYSTEM

(75) Inventor: Aaron Raymond Larson, Shoreview, MN (US)

(73) Assignee: Honeywell, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/397,275

(22) Filed: Sep. 16, 1999

(65) Prior Publication Data

US 2003/0154234 A1 Aug. 14, 2003

(51) Int. Cl.⁷ .................................................. G06F 9/00
(52) U.S. Cl. ..................................... 709/102; 709/107
(58) Field of Search ................................. 709/107, 108, 709/103; 379/265; 701/45, 48; 707/8; 713/502; 714/47; 368/10

(56) References Cited

U.S. PATENT DOCUMENTS

| 5,386,561 A | | 1/1995 | Huynh et al. | |
|---|---|---|---|---|
| 5,437,032 A | * | 7/1995 | Wolf et al. | 709/103 |
| 5,515,538 A | * | 5/1996 | Kleiman | 710/260 |
| 5,708,808 A | * | 1/1998 | Shoichi | 707/8 |
| 5,835,705 A | * | 11/1998 | Larsen et al. | 714/47 |
| 5,875,464 A | * | 2/1999 | Kirk | 711/129 |
| 5,908,470 A | * | 6/1999 | Stonecypher, Jr. | 713/502 |
| 5,938,708 A | * | 8/1999 | Wallace et al. | 701/45 |
| 5,995,745 A | * | 11/1999 | Yodaiken | 703/26 |
| 6,018,759 A | * | 1/2000 | Doing et al. | 709/108 |
| 6,021,425 A | * | 2/2000 | Waldron et al. | 709/103 |
| 6,052,707 A | * | 4/2000 | D'Souza | 709/106 |
| 6,110,220 A | * | 8/2000 | Dave et al. | 716/3 |
| 6,163,506 A | * | 12/2000 | Mundy | 368/10 |
| 6,189,022 B1 | * | 2/2001 | Binns | 709/100 |
| 6,341,347 B1 | * | 1/2002 | Joy et al. | 709/106 |
| 6,385,637 B1 | * | 5/2002 | Peters et al. | 379/265.03 |
| 6,385,638 B1 | * | 5/2002 | Baker-Harvey | 709/102 |

OTHER PUBLICATIONS

Douglas Comer. Operating System Design: The Xinu Approach. 1984. Bell Telephone Laboratories, Incorporated. pp. 53–64 and 123–138.*

Pam Binns. Incremental Rate Monotonic Scheduling for Improved Control System Performance. 1997. IEEE. pp. 80–90.*

John Penix et al. Verification of Time Partitioning in the DEOS Scheduler Kernel. 2000. IEEE. pp. 488–497.*

(List continued on next page.)

Primary Examiner—Ayaz Sheikh
Assistant Examiner—Christian A. LaForgia

(57) ABSTRACT

A time-partitioned system for accounting for processor time consumed by operating system services provided on behalf of an application running in a real-time environment. The time utilized by the operating system is treated as being application processing time, rather than viewing the resultant processor time consumed as an operating system overhead. Each application consists of one or more threads. A time budget is assigned to each thread and to each interrupt. The processor time consumed by the operating system when executing on behalf of a thread or interrupt is charged back to the application or interrupt as part of the application's time budget. Operating system overheads and processor interrupts are thus accounted for accurately enough to determine a schedule for the applications which is enforceable by the operating system.

20 Claims, 2 Drawing Sheets

OTHER PUBLICATIONS

Yoshifumi Manabe et al. A Feasibility Decision Algorithm for Rate Monotonic Scheduling of Periodic Real–Time Tasks. 1995. IEEE. pp. 212–218.*

Sandra R. Thuel et al. Algorithms for Scheduling Hard Aperiodic Tasks in Fixed–Priority Systems using Slack Stealing. 1994. IEEE. pp. 22–33.*

Wei Kuan Shih et al. Modified Rate–Monotonic Algorithm for Scheduling Periodic Jobs with Deferred Deadlines. 1993. IEEE. pp. 1171–1179.*

Lui Sha et al. Generalized Rate–Monotonic scheduling Theory: A Framwork for Developing Real–Time Systems. 1994. IEEE. pp. 68–82.*

Lei Zhou et al. Rate–Monotonic Scheduling in the Presence of Timing Unpredictability. 1994. IEEE. pp. 1–6.*

D.B. Stewart and P.K. Khosta; "High–assurance software systems are often implemented with the dangerous assumption that timing errors will never occur"; Communications of the ACM; Jan. 1997; vol. 40, No. 1.

J.M. Andre, A. Kung, P. Robin; "OX: ADA Cyclic Executive for Embedded Applications"; Proceedings of an International Symposium on 'On–board Real–time Software: ESTEC; Noordwijk, Nov. 13–15, 1995.

A. Atlas and A. Bestavros; "Statistical Rate Monotonic Scheduling"; IEEE Computer Soc.; Dec. 2, 1998; pp. 123–132.

International Search Report; PCT/US00/25543; Sep. 13, 2001; 4 pgs.

* cited by examiner

METHOD FOR TIME PARTITIONED APPLICATION SCHEDULING IN A COMPUTER OPERATING SYSTEM

FIELD OF THE INVENTION

This invention relates generally to computer operating systems, and more particularly, to a real-time operating system which schedules multiple threaded application programs or processes.

BACKGROUND OF THE INVENTION

Statement of the Problem

Real-time computer operating systems typically supervise the execution of multiple concurrently executing applications (more precisely, applications which are repetitively scheduled and whose execution is interleaved). These real-time operating systems must provide a means for scheduling the applications. In a 'hard' real time operating environment such as an aircraft cockpit, applications monitoring critical functions such as radio communication data and navigation information are typically executed together with applications monitoring other less critical functions. An operating system which supervises these multiple applications must ensure that the applications monitoring the less critical functions do not prevent the higher criticality applications from executing in a timely manner. In such an environment the computer operating system application scheduler must accomplish this by providing some form of time partitioning between the applications.

Presently available operating systems do not accurately account for operating system overheads such as interrupt handling, and are therefore incapable of enforcing timing boundaries between the applications. This lack of capability arises because existing Rate Monotonic Analysis (RMA) and Rate Monotonic Scheduling (RMS) theory and practice fail to account for computer operating system overheads and processor interrupts when determining the feasibility of a proposed schedule.

SUMMARY OF THE INVENTION

Solution

The application scheduling method of the present invention allows integration of critical real-time functions such as avionics display and control, while ensuring that the applications providing these functions are executed in a timely manner. The present scheduling method multiplexes processor ('CPU') time amongst multiple application threads. The time utilized by the operating system when executing on behalf of a thread is treated as being application processing time, rather than viewing the resultant processor time consumed as an operating system overhead. A time budget is assigned to each thread. The processor time consumed by the operating system when executing on behalf of a thread is charged back to the corresponding application as part of the application's time budget. The amount of CPU time available to a thread during a given period of its execution is guaranteed by the present method, which efficiently apportions available CPU time by interrupt masking and thread budgeting. Operating system overheads are thus accounted for accurately enough to determine a schedule for the applications which is enforceable by the operating system. Furthermore, the manner in which these overheads are accounted for permits run time creation and deletion of threads via traditional RMA methods.

Existing RMA theory accounts for operating system overheads by specifying a bound on the percent utilization that is expected to be used by the operating system on behalf of the applications running on the operating system. However, in a real-world system, there are three categories of overhead that should actually be accounted for:

1. First, interrupt response and other activities performed by the operating system that result from the passage of time must be accounted for. An example is a response to the periodic system clock 'tick' that provides notice of the passage of time to the operating system.
2. Secondly, application-induced overheads resulting from the invocation of operating system services should be accounted for.
3. Finally, the time taken in responding to asynchronous interrupts, e.g., non-periodic I/O such as network interface controller interrupts, needs to be accounted for.

These operating system overheads each require distinct mechanisms to accurately account for their use of processing time in an RMA-based scheme. Category 1 overheads (e.g., periodic system clock interrupt handling), by definition, are strictly a function of time, and thus the standard RMA technique of specifying them as utilization overhead is adequate.

Category 2 overheads (calls to operating system services) are a function of application behavior and cannot, in general, be accounted for in the manner of category 1 overheads. This is because application-induced overheads are not dependent solely on the passage of time; rather, in addition, they depend on the particular activities initiated by the applications. Category 2 overheads can be subdivided into two types:

2A. CPU time consumed by operating system services provided on behalf of an application; and 2B. Blocking time introduced by the effective priority elevation associated with disabling and enabling interrupts associated with a given application.

Overheads associated with category 2A activities are accounted for by the method of the present invention by viewing the time utilized as being application processing time, rather than viewing the resultant CPU time consumed as an operating system overhead. The present method charges this CPU time back to the application as part of the application's time budget.

Overheads associated with category 2B activities can be modeled as a mutex blocking time. Mutex (MUTual EXclusion) services are system functions which permit multiple threads to have synchronized access to application resources. For example, if an application uses multiple threads, and those threads share a common resource such as a data structure, mutexes can be used to ensure that only one thread can access the data structure at a given time.

The method of the present invention models category 2B blocking time by viewing a critical section as a mutex having the following properties:

a) A priority ceiling one greater than the highest actual application priority;

b) a period equivalent to the shortest period in the system being analyzed; and c) a duration equal to the duration of the time-critical section associated with the longest critical section not part of a category 1 overhead (the period of time when interrupts are disabled).

Overheads associated with category 3 activities cannot, in general, be modeled as a strict utilization of operating system resources by an application. Existing RMA and RMS theory approximates the cost of category 3 overheads by specifying a processing time for each occurrence of the interrupt and a minimum inter-arrival rate for the interrupt, e.g. N interrupts per second, with each interrupt consuming M seconds. The result is a time utilization associated with the interrupt (M*N). Enforcing a schedule directly resulting from such an analysis requires keeping track of the inter-arrival rate of the interrupt, as well as the time consumed by each interrupt response.

One embodiment of the present invention eliminates the need for tracking the interrupt inter-arrival rate by (1) activating a thread in response to an interrupt; (2) associating a time period with the interrupt; and (3) ensuring that during that period the aggregate CPU utilization resulting from handling as many interrupts as necessary does not exceed an allowed value. This aspect of the invention, if implemented, subsumes the category 2B overheads described above. An alternative embodiment provides an interrupt with all of the properties described for a thread in the previous embodiment. In this case, the arrival of an interrupt and the termination of the interrupt handling are treated as a pseudo-thread activation.

Either of these (interrupt thread or pseudo-thread) solutions permits any number of interrupts associated with a specific interrupt to arrive during the associated period and also permits variability in processing time for each individual interrupt, as long as the aggregate used CPU utilization for the period does not exceed the allowed value for that particular interrupt. This method greatly simplifies the enforcement of the application's budget because once the aggregate CPU time for the period has been exhausted, the interrupt can be masked until the end of the period associated with the interrupt. The act of leaving the interrupt masked when the CPU utilization has been exhausted is sufficient to ensure that no additional CPU time will be used by the interrupt handler and thus proper time partitioning is enforced.

BRIEF DESCRIPTION OF THE DRAWING

The invention may be better understood from a reading of the following description thereof taken in conjunction with the drawing in which.

DETAILED DESCRIPTION

The present invention provides a mechanism for accounting for operating system overheads and processor interrupts in order to schedule multi-threaded application programs or processes in a manner which is enforceable by the operating system. In the context of the present method, an application (synonymous with the term 'process', for the purposes of this document), can have any number of threads. Every thread is associated with an application, which is considered to be the owner of the thread. The exact number of threads that can be active at any given time is a function of the CPU budget provided to the application, and the amount of CPU (processor) utilization allocated to the application's threads.

The thread scheduler of the present invention requires that every thread have a period associated with the thread. The thread scheduler is rate monotonic; i.e., it assigns priorities based on the rate of the thread (shorter duration periods have higher priority). In addition, it is required that each period be harmonic. For example, periods of 25 ms, 50 ms, and 75 ms are multiples of a base period, but the 75 ms is not harmonic, as it is not a multiple of 50 ms. Periods of 25 ms, 50 ms, and 100 ms, however, are harmonic, and thus comply with the requirements of the present method.

A typical periodic thread operates in an infinite loop, performing the same logic over and over each period. The present method allows a thread to call a thread relinquishment service that is intended to be called within that loop. The service suspends the thread until that thread's next period. This voluntary relinquishing of the CPU allows other threads in the system to execute.

Every periodic thread has a CPU budget that represents the maximum amount of time the thread can control the CPU's resources during its period. In some applications the thread relinquishment service is called before that application's budget is used up. In other applications, the thread runs in a continuous loop until the budget is exhausted, at which point an interrupt is generated by an external timer. The operating system then suspends the thread until the start of its next period, thus allowing other threads in the system to execute on time.

Each thread contains a structure containing its thread execution status. In this structure are kept the initial CPU budget and the remaining budget after the last time the thread was suspended, and the PeriodCtr of the period in which the thread's budget was last replenished. Each rate is assigned a counter which is incremented each time that rate repeats. (This counter is referred to as the PeriodCtr). The location of a given thread's thread execution status structure can be obtained by use of an appropriate system function. The values stored in the thread execution status structure can be reported by a status monitor process and can be used to help determine a suitable value for the thread's budget.

Figure 1:
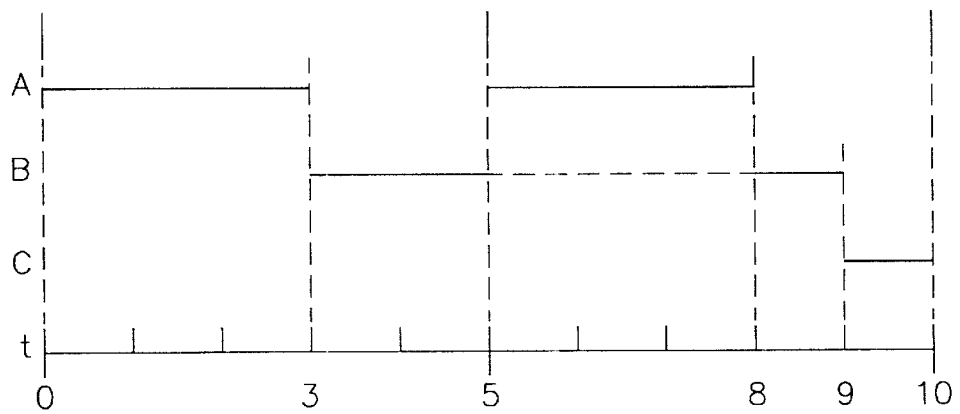
FIG. 1 is a diagram illustrating the scheduling of three application threads.
Figure 2:
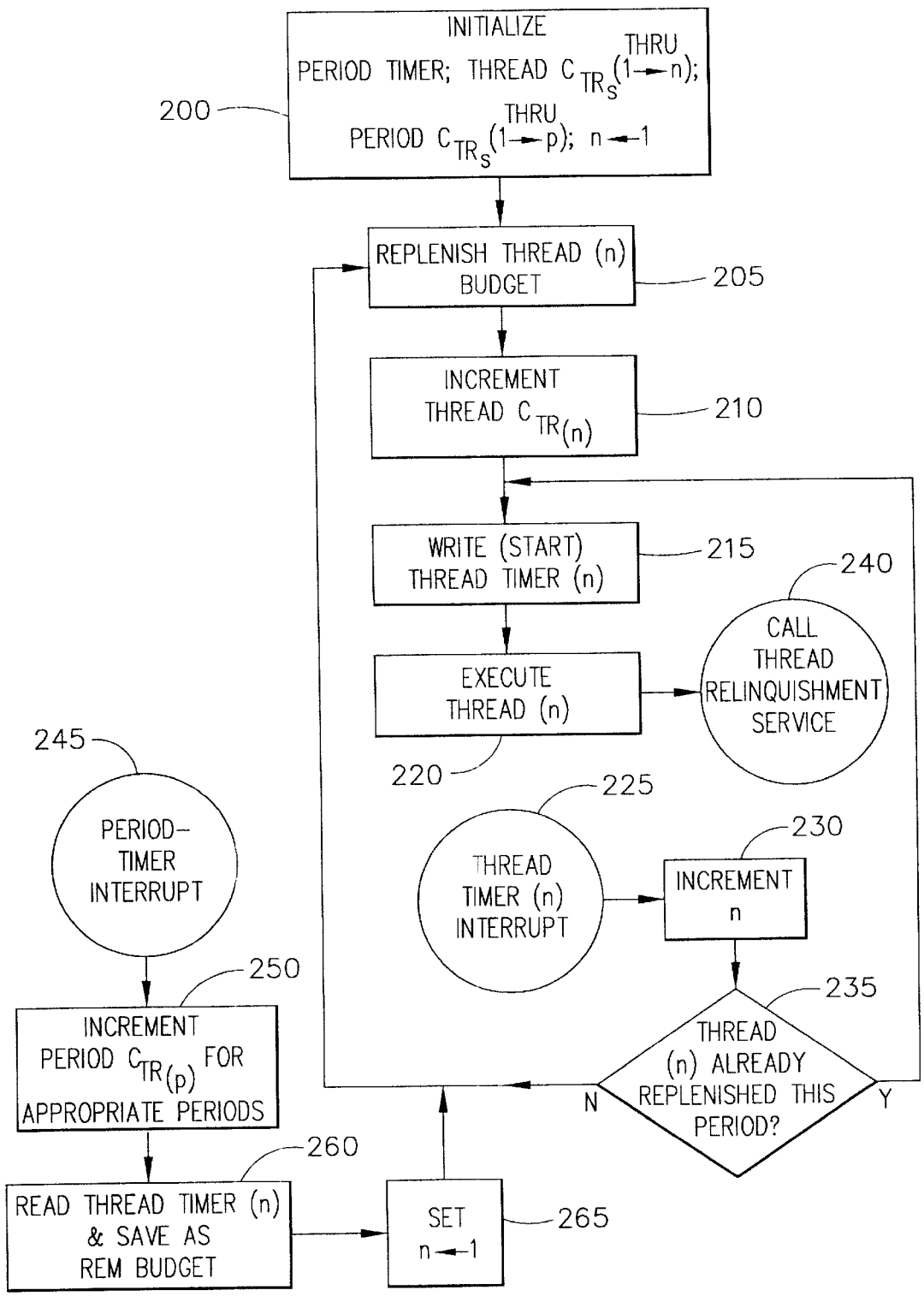
FIG. 2 is a flowchart showing the thread scheduling process.

The method of the present invention implements Rate Monotonic Scheduling ('RMS') with a priority inheritance protocol. The RMS method prioritizes periodic thread execution according to the thread's period. Higher rate threads have higher priority. The priority inheritance protocol ensures that threads wishing to lock a mutex are not prevented from doing so by threads having a lower priority. Operating System Service Request Overheads FIG. 1 is a diagram illustrating the scheduling of three application threads, A, B, and C; and FIG. 2 is a flowchart showing the thread scheduling process. The present method is best understood by reference to FIG. 1 in conjunction with FIG. 2. The periods employed in the present example are 5 units and 10 units. Thread A has a period of 5 units and runs for 3 units each period. Thread B has a period of 10 units and runs for 3 units each period. Thread C has a period of 10 units and runs for 1 unit each period.

With reference to FIG. 2, at step 200, system parameters are initialized as follows. A period timer is set to the base (minimum length) period for the threads being scheduled, which in this example, is 5 units. The period timer generates an interrupt at the end of every minimum length period. Finally, the active thread number n is initialized to a value of 1, which represents thread A, the highest priority thread in the present example. Each thread counter ThreadCtr (n) 1 through N is set to 0 (where N is the number of threads; i.e. 3, in this case, and n represents the thread number); and each period counter PeriodCtr (p), 1 through P, is set to 1 (where P is the number of periods; i.e., 2, in this example, and p represents the specific period). In this example, p has a value of 1 for the base period of 5 units, and a value of 2 for the 10 unit period.

In addition to being assigned a period, every thread is assigned an initial budget. At step 205, the budget for thread n is established by setting the budget to a pre-established value which is determined as described below with reference to FIG. 4. If the remaining budget of a thread were 'replenished' from the initial budget at every period boundary, the replenishment operation would have a run time overhead proportional to the maximum number of threads having that period. In systems where there is no period boundary skew, all threads would be replenished at one period boundary, resulting in an overhead which would be proportional to the total number of threads in the system. However, the replenishment must be an atomic operation, which would result in a critical section that is effectively unbounded (i.e., bounded only by the number of threads in the system), thus causing an arbitrarily large interrupt response latency.

The present method eliminates this unbounded interrupt response latency by distributing the occurrence of the times when the budget replenishment occurs. This is accomplished by associating a period counter (PeriodCtr) with each period p, and a "last executed counter value" (ThreadCtr), with each thread n. As shown in FIG. 2, at step 210, the thread counter for thread B, ThreadCtr (1), is incremented to a value of 1. ThreadCtr (n) is thus set to the same value as PeriodCtr (p(n)) [where (p(n)) is period 1, thread n's period], to indicate that the budget for thread (n) has been replenished for its period. Every time that the CPU begins performing instructions on behalf of the thread, ThreadTimer (n) is set to the remaining budget for that thread, minus a reserved overhead. Thus, at step 215, the value of RemBudget (n) (the remaining budget for that thread)) is written to ThreadTimer (n) (where n=1 for thread A) and the thread timer is started. In the scenario of FIG. 1, at step 220, thread A starts executing at time t=0.

After thread A has started executing, it continues execution until one of three events occur: (1) the thread invokes the thread relinquishment service, at step 240; (2) the thread budget is exhausted, at which point an interrupt is generated by a thread timer interrupt; or (3) a period timer interrupt (signaling that a period boundary has been reached) or other interrupt occurs. When either event 1 or event 2 occurs, the thread is then suspended until the start of its next period. If event 3 occurs, the thread is suspended until the higher priority threads made ready by the interrupt have completed, after which, processing of the thread continues. As shown in FIG. 1, at time t=3, thread A execution is suspended by a thread timer interrupt at step 225, since thread A runs for 3 units in a 5 unit period. At step 230, n (the thread number) is set to a value of 2 for thread B (at this point the operating system executes a "context switch" to thread n). Next, at step 235, it is determined whether the budget for thread(n) has been replenished for its present period. This is done by comparing ThreadCtr (n) with PeriodCtr (p(n)). If the two counters are equal, the thread's budget has already been replenished for its period. Otherwise, as in the present case for thread B (since, PeriodCtr (p(B))=1, and ThreadCtr(B)= 0, where B=2), this is the first time that thread B has executed in its period. Therefore, at step 205, the budget for thread B is replenished. At step 210, ThreadCtr (2) is set to a value of 1 (i.e., a value equal to the thread's period counter), to indicate that the budget for thread B has now been replenished for its period. Thus the undesirable, single, "unbounded" operation of replenishing N thread budgets is converted into N+1 short, constant time operations: the incrementing of the period's counter, and N replenishment operations, one for each thread.

At step 215, the thread timer for thread B is started. As shown in FIG. 1, thread B starts executing at time t≈3 (at step 220). The precise time at which initiation of execution of thread B actually occurs is somewhat later than t=3, because of the time consumed by the thread timer write/read operations and the context switching time incurred, as explained below with reference to FIG. 4. As shown in FIG. 1, at time t=5, a period boundary is reached, and a period timer interrupt is generated, at step 245. At the initiation of each base period, at step 250, the period counters are incremented for each period having a boundary at that re-occurrence of the base period. In the present case, PeriodCtr (1), the period counter for the base period is incremented, but the period counter for the 10 unit period [PeriodCtr (2)] is not. At step 260, the thread timer for thread B [ThreadTimer (2)] is read, and the remaining time stored therein is saved as RemBudget (2), the remaining budget for thread B for period 2. At step 265, thread counter n is (re)set to a value of 1, indicating that the highest priority thread, thread A, is to be executed at the beginning of the base period starting at time t=5.

At step 205, Thread A's budget is replenished, and thread A executes as described above, for steps 210, 215, and 220. As shown in FIG. 1, at time t=8, execution of thread A is suspended by a timer interrupt generated by thread A's timer [ThreadTimer (1)] at step 225, since thread A runs for 3 units in a 5 unit period. At step 230, n (the thread number) is incremented to a value of 2 for thread B. Next, at step 235, it is determined whether the budget for thread(n) has been replenished for its present period. Since PeriodCtr (p(B)) and ThreadCtr(B) are both equal to 1, thread B has already been replenished for its period, and execution of thread B is resumed at time t≈8. Therefore, the thread timer for thread B is resumed at step 215 by writing the amount of time remaining in thread B's budget, RemBudget(B), to ThreadTimer (B).

At time t=9, execution of thread B is suspended by a timer interrupt generated by thread B's timer [ThreadTimer (2)] at step 225, since thread B's total budget (3 time units) for its 10 unit time period (period 2) has been exhausted.

Finally, execution of thread C is initiated at time t≈9, and at time t=10, thread C's budget (1 time unit) expires. The diagram of FIG. 1 then wraps back to time t=0, and the above-described process is repeated.

Interrupt Handling Overheads

In an exemplary embodiment of the present invention, a time period is associated with an interrupt, and a thread is activated in response to the interrupt. Category 2B overheads are enforced by ensuring that during that period the aggregate CPU (processor) utilization resulting from handling as many interrupts as necessary does not exceed a predetermined allowed value. This method permits any number of interrupts associated with a specific interrupt to arrive during the associated period and also permits variability in processing time for each individual interrupt, as long as the aggregate used CPU utilization for the period does not exceed the allowed value for that particular interrupt. Once the interrupt's aggregate CPU time for the period has been exhausted, the interrupt is masked until the end of the period associated with the interrupt. The act of leaving the interrupt masked when the CPU utilization has been exhausted is sufficient to ensure that no additional CPU time will be used by the interrupt handler and thus proper time partitioning is enforced.

Figure 3:
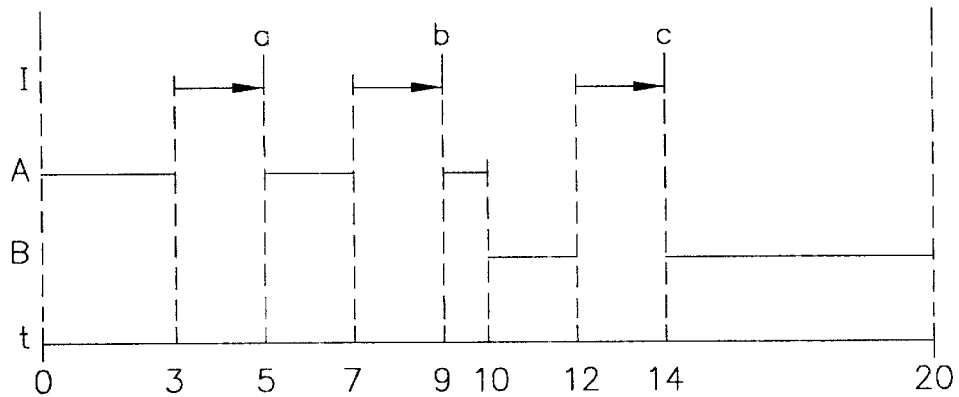
FIG. 3 is a diagram illustrating the execution of an interrupt handler 'I' and two application threads.

FIG. 3 is a diagram illustrating the execution of an interrupt handler 'I' and two application threads, 'A' and 'B', all of which have an associated period of 20 units. As shown in FIG. 3, thread A requires 6 time units to execute, and thread B requires 8 time units to execute, each 20 unit period. Therefore, threads A and B are scheduled for a total of 14 units in each 20 unit period, which leaves 6 units in each period remaining for handing interrupts. Interrupt handler 'I' can be viewed as (1) a thread which is activated in response to an interrupt request and treated exactly as the threads described with respect to FIG. 1; or (2) it can be considered to be a 'pseudo-thread' having all of the properties of 'formal' threads including an associated time period and a time budget for the associated period. In either case, interrupt handler 'I' can preempt the execution of other threads numerous times in a given period, provided that the sum of the duration of time of each execution of the interrupt handler does not exceed the time utilization (budget) reserved for the thread/pseudo-thread for any period.

In an exemplary embodiment of the present system, interrupt handler 'I' is masked at all times except when the interrupt handler thread is in a wait state in which it is waiting for the next occurrence of an interrupt. Therefore, if the interrupt thread is suspended, for example, by exceeding its time budget (or if the thread 'voluntarily' suspends itself), then the interrupt merely remains masked. This situation, wherein an interrupt is masked except when specifically waiting for the occurrence of an interrupt, ensures that the device associated with the interrupt is always in the proper state.

As shown in FIG. 3, thread A executes from time t=0 until t=3, at which time it is preempted by interrupt handler 'I', which executes for 2 time units until time t=5, at point 'a'. Execution of thread A resumes until t=7, at which time it is again preempted by interrupt handler 'I', which executes for 2 time units until time t=9, at point 'b'. At this point, interrupt handler 'I' (i.e., thread/pseudo-thread 'I') has consumed a total of 4 time units. Thread A resumes execution from t=9 to t=10, where execution of thread B is initiated. At t=12, thread B is preempted by interrupt handler 'I', which executes for 2 time units until time t=14, at point 'c'. At point 'c', interrupt handler 'I' has consumed a total of 6 time units, which exhausts its budget for the period, so the interrupt associated with interrupt handler 'I' remains masked until the end of the present period. Therefore, execution is transferred to thread B (or some other thread, if scheduled) for the remainder of the period.

Thread Budget Time Apportionment

A problem incurred by prior art scheduling methods is that computations of blocking time associated with mutexes assume that all the potential time used by a thread is accounted for. However, If a thread were to invoke an operating system function within t units prior to the time when the thread timer is scheduled to expire, and the invoked operating system function requires t or more units of time to execute, then the thread timer may actually become negative, thus preventing enforcement of proper thread scheduling. The reason the timer could become negative is that various critical operating system operations must be done atomically, and hence the interrupt associated with the thread timer is masked (ignored) during these 'critical sections'. If a critical section is entered just prior to when a timer expires (times out), the timer will not be acknowledged for the duration of the critical section. Furthermore, the time that it takes to switch between threads must be accounted for. To account for this context switching time, the present method sets the thread timer to a value which is less than the thread's remaining time budget, as explained in the following section.

Figure 4:
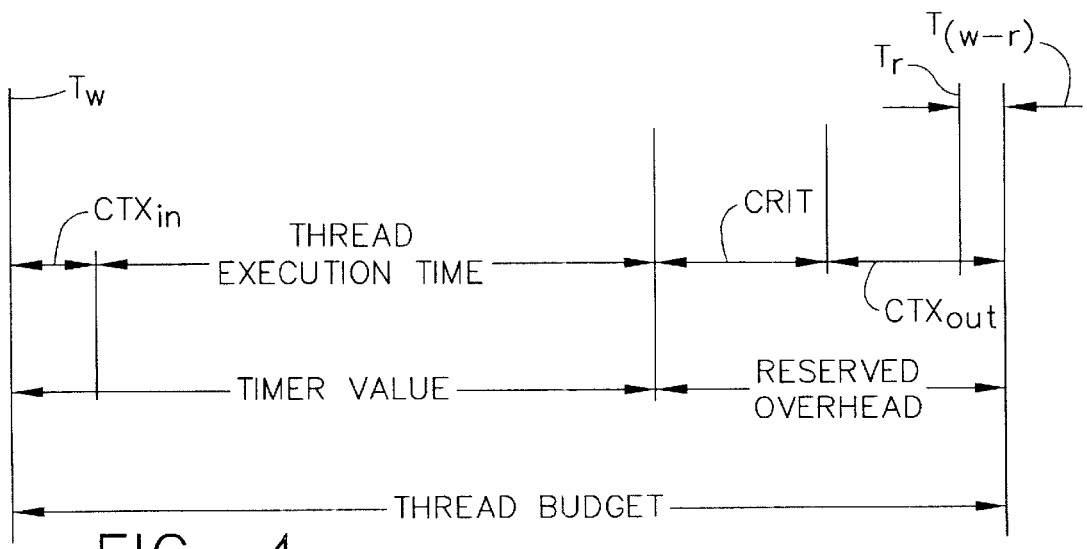
FIG. 4 is a diagram illustrating timing events of interest for a single thread activation.

FIG. 4 is a diagram illustrating time relationships between the entities comprising a typical thread activation. Terms appearing in capital letters below correspond to the various thread budget segments in the diagram. As shown in FIG. 4, when a thread timer is initially set for a given thread, the Timer Value to which the thread timer is set is determined by subtracting a Reserved Overhead value from the thread's total time budget. This Reserved Overhead corresponds to the amount of time consumed by longest critical section of instructions executed by the operating system during which interrupts are disabled (denoted as CRIT), plus the time that it takes to perform a thread context switch out of the presently executing thread (denoted as CTXout). It should be noted that the term 'longest critical section' is used herein to denote the longest critical section of instructions that does not perform a context switch to a different thread.

It can be noted that the thread is interrupted at a 'terminal' time equal to CTXout+CRIT time units before its budget is exhausted and the timer expires. Since a thread must always context switch to some other thread, the value for CTXout is correctly accounted for. However, the thread will not, in general, be invoking a critical section of operating system instructions when the timer interrupt arrives, and thus the CRIT time is potentially wasted. However, if a thread is activated multiple times in a single period, the "wasting" of the CRIT time is limited to the last activation of the thread, since the actual thread execution time is determined by reading the thread timer during the context switch.

Proper accounting of the time between the time (Tr) the timer is read (i.e., 'set' or 'reset') and the time (Tw) the timer is written (i.e., 'started') is shown as T(w-r), and is subtracted from the Thread Budget when determining the Timer Value. The time T(w-r) is included in CTXout, and is thus included as part of the Reserved Overhead. Although not included in the actual Thread Execution Time, the time during which the timer is written defines the CTXin portion of the context switch that occurs while the timer is running on behalf of the thread, and hence is not subtracted as overhead. This CTXin time period includes the time taken by the operating system to make the thread ready for execution, including the time spent to replenish the thread's budget, when such a replenishment operation occurs. The Timer Value is thus the sum of CTXin and the Thread Execution Time.

Although the foregoing description sets forth exemplary embodiments of the invention, the scope of the invention is not limited to these specific embodiments. Modification may be made to the specific form and design of the invention without departing from its spirit and scope as expressed in the following claims.

I claim:

1. A method for enforcing a schedule for a plurality of concurrently executing applications, each of which comprises at least one thread, the method comprising the steps of:

associating, with each said thread, a recurring corresponding time period;

establishing, for each said thread, a corresponding time budget;

establishing a reserved time overhead for each said thread;

subtracting, from each said corresponding time budget, the reserved time overhead established for each said thread during the corresponding time period to determine an adjusted corresponding time budget for each said thread; and tracking each said thread's adjusted corresponding time budget during execution of each said thread and terminating execution of each said thread when said thread's adjusted corresponding budget has been depleted for the corresponding time period.

2. The method of claim 1, wherein the step of establishing a time budget for each said thread includes replenishing the corresponding time budget only once during each said corresponding time period, thereby distributing said replenishing with respect to time.

3. The method of claim 2, wherein said replenishing is performed the first time each said thread is made ready to execute during each said corresponding time period.

4. The method of claim 1, wherein said reserved time overhead includes the time required to perform a context switch out of an executing said thread.

5. The method of claim 1, wherein said reserved time overhead includes the greatest length of time for which the operating system disables interrupts.

6. The method of claim 1, wherein said reserved time overhead includes the time required to perform a context switch out of an executing said thread plus the greatest length of time for which the operating system disables interrupts while executing a critical section of instructions.

7. The method of claim 1, wherein the step of tracking each said thread's adjusted corresponding time budget during execution of each said thread comprises the steps of:

associating, with each said thread, a corresponding timer;

setting said timer associated with a given said thread to a timer value at the beginning of each said period associated with the given thread;

starting the timer associated with the given thread when the given thread begins executing;

stopping the timer when execution of the associated thread is terminated; and determining that said budget for said given said thread has been depleted when the timer has expired.

8. The method of claim 7, wherein said reserved time overhead established for each said thread during the corresponding time period includes the time required to perform a context switch out of an executing said thread.

9. The method of claim 7, wherein said reserved time overhead established for each said thread during the corresponding time period includes the greatest length of time for which the operating system disables interrupts while executing a critical section of instructions.

10. The method of claim 7, wherein said reserved time overhead established for each said thread during the corresponding time period includes the sum of:

(1) the time required to perform a context switch out of an executing said thread; and (2) the greatest length of time for which the operating system disables interrupts while executing a critical section of instructions.

11. The method of claim 10, including the step of performing a context switching operation when the adjusted corresponding time budget for an executing thread has been depleted.

12. The method of claim 11, wherein:

the context switching operation results in execution being transferred to said thread having a priority the same as or lower than the thread presently executing, if said thread having a lower priority exists; otherwise, the context switching operation results in execution being transferred to said thread having the highest priority.

13. A method for enforcing a schedule for a plurality of concurrently executing applications, each of which comprises at least one thread, the method comprising the steps of:

associating, with each said thread, a recurring corresponding time period;

establishing, for each said thread, an initial corresponding time budget;

establishing a reserved time overhead for each said thread;

accounting for the reserved time overhead for each said thread during each said corresponding time period by subtracting, from each said initial corresponding time budget, the sum of the time required to perform a context switch out of an executing said thread plus the greatest length of time for which the operating system disables interrupts while executing a critical section of instructions, said subtracting determining an adjusted corresponding time budget for each thread;

tracking each said thread's adjusted corresponding time budget during execution of each said thread and terminating execution of each said thread when said thread's adjusted corresponding budget reaches a terminal value for the corresponding time period; and replenishing the initial corresponding time budget only at the first time each said thread is made ready to execute during each said corresponding time period.

14. The method of claim 13, wherein the step of tracking each said thread's adjusted corresponding time budget during execution of each said thread comprises the steps of:

associating, with each said thread, a corresponding timer;

setting said timer associated with a given said thread to a timer value at the beginning of each said period associated with the given thread;

starting the timer associated with the given thread when the given thread begins executing; and determining that said budget for said given said thread reaches said terminal value when the timer has expired; and stopping the timer when execution of the associated thread is terminated.

15. A method for accounting for the processing time overhead consumed by responding to an asynchronous interrupt generated on behalf of one of a plurality of concurrently executing applications, wherein the interrupt is treated as a thread which consumes processing time overhead by invoking a computer operating system service, the method comprising the steps of:

associating a recurring time period with the thread;

establishing an initial time budget for the thread;

subtracting, from the budget, the processing time overhead consumed by the thread during the time period;

masking the interrupt unless the thread is waiting for an occurrence of the interrupt;

if the thread's budget is depleted, then continuing to mask the interrupt until the beginning of the next said time period; and replenishing the initial time budget only during the first time the thread is made ready to execute during each subsequent said time period.

16. The method of claim 15, wherein the processing time overhead consumed by the thread during the time period includes the sum of:

(1) the time required to perform a context switch out of the thread;

(2) the greatest length of time for which the operating system disables interrupts while executing a critical section of instructions.

17. The method of claim 16, including the additional steps of:

associating a timer with the thread;

setting the timer to a predetermined value at the beginning of each said period associated with the thread;

starting the timer when the thread begins executing;

stopping the timer when execution of the thread is terminated; and determining that the budget for the thread is depleted when the timer has expired.

18. A method for accounting for processing time overhead consumed by a computer operating system in responding to an asynchronous interrupt, the method comprising the steps of:

associating a recurring time period with the interrupt;

establishing an initial time budget for the interrupt;

subtracting, from the budget, the time utilized by the operating system in handling an occurrence of the interrupt;

masking the interrupt until the beginning of the next said time period, if the budget is exhausted during a present time period; and, replenishing the initial budget for the interrupt at the beginning of the next time period associated with the interrupt.

19. The method of claim 18, wherein the step of subtracting includes subtracting the sum of:

(1) the time required to perform a context switch out of the interrupt;

(2) the greatest length of time for which the operating system disables interrupts while executing a critical section of instructions.

20. The method of claim 19, including the additional steps of:

associating a timer with interrupt;

setting the timer to a predetermined value at the beginning of each said period associated with the interrupt;

starting the timer associated with the interrupt when the operating system begins executing on behalf of the interrupt;

stopping the timer when the operating system ceases executing on behalf of the interrupt; and masking the interrupt for the remainder of the present time period if the timer expires.

* * * * *